Feb. 17, 1942.     H. W. KIEFER     2,273,048
WIRE STRIPPING IMPLEMENT
Filed May 2, 1940
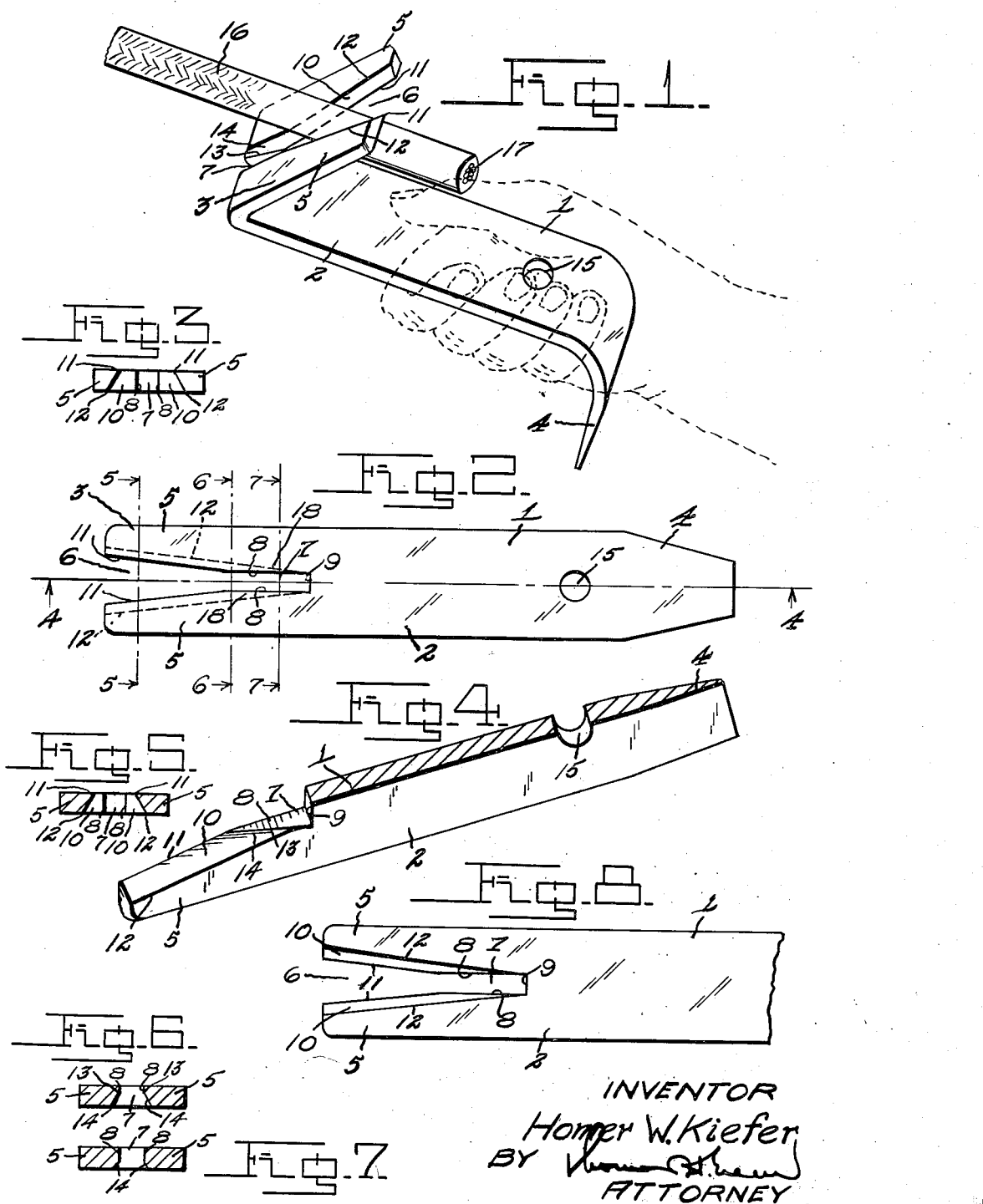
INVENTOR
Homer W. Kiefer
BY
ATTORNEY Patented Feb. 17, 1942

2,273,048

UNITED STATES PATENT OFFICE 2,273,048

WIRE STRIPPING IMPLEMENT

Homer W. Kiefer, Princeton, N. J.

Application May 2, 1940, Serial No. 332,965

2 Claims. (Cl. 81—9.5)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to wire strippers and more particularly to a device for use in stripping insulation from wires.

One of the objects of the invention is to provide an improved implement for use by electricians such as telephone-switchboard installers, linemen and others, for stripping the covering or insulation off circuit wires or cables, which implement is easy to manipulate, efficient in use and so constructed that the covering or insulation may be quickly and easily stripped from the wires or cables without damage thereto.

Another object of the invention is to provide a wire stripper having a bifurcated portion bent at an acute angle to the body of the stripper and including cutting edges for cutting and stripping the insulation from wires and means for parting the insulation after it has been cut, whereby the insulation may be readily stripped from the wires.

Briefly stated, this invention is an implement for stripping insulation from wires and comprises an integral blank of metal having a bifurcated portion at one end including beveled cutting edges and a slot having vertical parallel sides, the beveled cutting edges intersecting the slot in such a manner as to provide an inclined abutting or cam portion which is adapted to part the insulation after it has been cut, and the bifurcated portion being bent back toward the body of the implement at an acute angle thereto for engagement with an insulated wire for removing the insulation therefrom. A screw driver portion may be provided on the other end of the blank which may be bent downwardly in an opposite direction from the bifurcated portion for engagement with screws and the like.

In using the wire strippers at present employed, it is generally necessary to use the fingers to force the insulated wire into engagement with the cutting edges of the stripper before the insulation can be removed from the wire, thereby causing unnecessary delay in stripping the insulation from the wire, also causing the fingers to be placed in a position where they are liable to be cut and after the part of the insulation to be stripped has been cut from the main portion no means is provided on the strippers to separate it from the insulation remaining on the wire.

It is therefore the aim and purpose of this invention to devise an implement for cutting and stripping insulation from wire which is adapted to engage the wire in such a manner that it will cut the insulation thereon without the necessity of using the fingers to force the insulated wire into engagement with the cutting edges of the stripper and to so design the stripper that the cut insulation to be stripped from the wire will be separated and broken away from the part of the insulation to remain on the wire.

The construction, novel design and cooperation of the various features of this invention is hereinafter more particularly described and is illustrated in the accompanying drawing; it being understood, however, that various changes in form, proportion and other details oi construction may be resorted to without departing from the spirit or sacrificing any of the advantages of this invention.

Referring more particularly now to the accompanying drawing in which corresponding parts are indicated by similar reference characters:

Fig. 1 is a perspective view of the invention with an insulated wire in position to be cut and stripped and showing the manner of gripping the implement by the hand;

Fig. 2 is a front plan view of the cut blank from which the implement is formed;

Fig. 3 is a left-end view of Fig. 2;

Fig. 4 is a perspective longitudinal sectional view of the cut blank taken on the line 4—4 of Fig. 2;

Figs. 5, 6, and 7, are cross-sectional views taken on the lines 5—5, 6—6, and 7—7, of Fig. 2; and Fig. 8 is a fragmentary rear plan view of the cut blank.

In the illustrated embodiment characterizing the invention, 1 indicates an elongated strip or blank of hard steel or other suitable material from which the wire stripping implement is formed.

The strip or blank 1 is provided intermediate its ends with a central body portion 2, having a bifurcated portion 3, at one end and a tapered portion 4 at its other end which may be used as a screw driver or like instrument.

The bifurcated portion 3 forms a pair of opposed jaws 5 between which is a V-shaped space or tapered notch 6 which converges inwardly from the outer ends of the jaws toward a substantially U-shaped slot 7 having vertical parallel side walls 8 and a rear wall 9. The inner surfaces or sides 10 of the jaws are beveled on converging lines in a plane differing from the vertical plane of the side walls 8 of the slot 7 and form inner cutting edges 11 and outer edges 12 which converge into the vertical side walls 8 of the slot 7 in such a manner as to form inner edges 13 which extend diagonally the corners of the side walls 8, that is to say, that the edges 13 extend from the outer upper edge of the side walls 8 of the slot at the inner ends of the cutting edges 11 downwardly and rearwardly to closely adjacent the inner lower edge of the side walls whereby a downwardly and outwardly inclined abutment or cam surface 14 is provided opposite each of the edges 13 on the surfaces 10 of the jaws 5 for a purpose which will hereinafter appear.

In forming the strip or blank 1 into an implement for cutting and stripping insulation from wires the bifurcated portion 3 is bent substantially at the line 7—7 of Fig. 2 back toward the body portion 2 of the blank at an acute angle thereto with the cutting edges 11 facing the user of the implement as illustrated in Fig. 1. The screw driver portion 4 may be bent downwardly from the opposite side of the body portion from said bifurcated portion to receive the operator's hand, said screw driver portion 4 thus cooperating to permit a firm hold on the implement by the user. An aperture 15 may be provided on the implement for hanging it on a hook or the like when not in use.

In using the implement, assuming that it is desired to remove the insulation 16 from a wire or cable 17, as illustrated in Fig. 1, the implement is first grasped by the hand at the screw-driver portion 4 and caused to engage the insulated wire 17 at the bifurcated portion 3 with the insulated wire between the jaws 5 in the tapered notch 6 and then the implement is given a pull lengthwise to the insulated wire, whereby, due to the acute angle of the bifurcated portion 3 with the body portion 2 of the implement the wire will progressively enter the notch 6 to be cut by the cutting edges 11. This action continues until the wire reaches the beginning of the edges 13 at the side walls 8 of the slot 6, whereby the inner end of the insulation to be stripped from the wire will engage the outer flat surface portion 18 of the body portion 2 adjacent to the upper edges of the side walls 8 of the slot 7 and the end of the insulation to remain on the wire will abut against the abutment or cam surface 14 adjacent to the edges 13 and be progressively cammed or forced rearwardly and outwardly to separate and break the insulation after it has been severed by the cutting edges 11, whereby the cut part of the insulation 16 to be removed may be easily stripped from the wire 17 by continuing to pull the implement lengthwise to the wire.

It will thus be seen that there has been provided a novel and useful form of implement for stripping the insulation from covered wires which is well adapted for all the purposes indicated. Even though there has herein been described a wire stripper having certain features of construction, it is nevertheless to be understood that various changes may be made therein if the changes do not depart from the spirit or scope of the claims.

Having described my invention, what I claim as new and wish to secure by Letters Patent is:

1. A wire stripping implement comprising a body portion including a pair of opposed jaws at one end having a tapered notch between them forming an opening to embrace an insulated wire, the sides of said notch converging and terminating in a slot, a cutting edge provided on the sides of said tapered notch and adapted to sever insulation on said wire and an inclined surface formed on the sides of said tapered notch against which the insulation may abut to separate it after being severed, said implement adapted to strip the insulation from the wire when drawn lengthwise thereto between said jaws.

2. A wire stripping implement comprising a body portion having a bifurcated portion at one end including a tapered notch forming an opening to embrace an insulated wire, said bifurcated portion being at an acute angle to said body portion, the sides of said tapered notch providing cutting edges adapted to sever insulation on said wire, said sides of said tapered notch converging and terminating in a slot including parallel side walls, and a downwardly extending cam surface portion provided on the inner ends of the sides of said tapered notch adjacent to the side walls of said slot and adapted to separate said severed insulation, said implement adapted to strip the insulation from the wire when drawn lengthwise thereto between said tapered notch.

HOMER W. KIEFER.